O. C. HOUGHTON.
TRANSMISSION FOR MOTOR VEHICLES.
APPLICATION FILED APR. 4, 1918.

1,317,297.

Patented Sept. 30, 1919.
4 SHEETS—SHEET 1.

WITNESSES:

INVENTOR:
ORLEY C. HOUGHTON,
BY
ATTORNEYS.

O. C. HOUGHTON.
TRANSMISSION FOR MOTOR VEHICLES.
APPLICATION FILED APR. 4, 1918.

1,317,297.

Patented Sept. 30, 1919.
4 SHEETS—SHEET 2.

WITNESSES:

INVENTOR:
ORLEY C. HOUGHTON.
BY
ATTORNEYS.

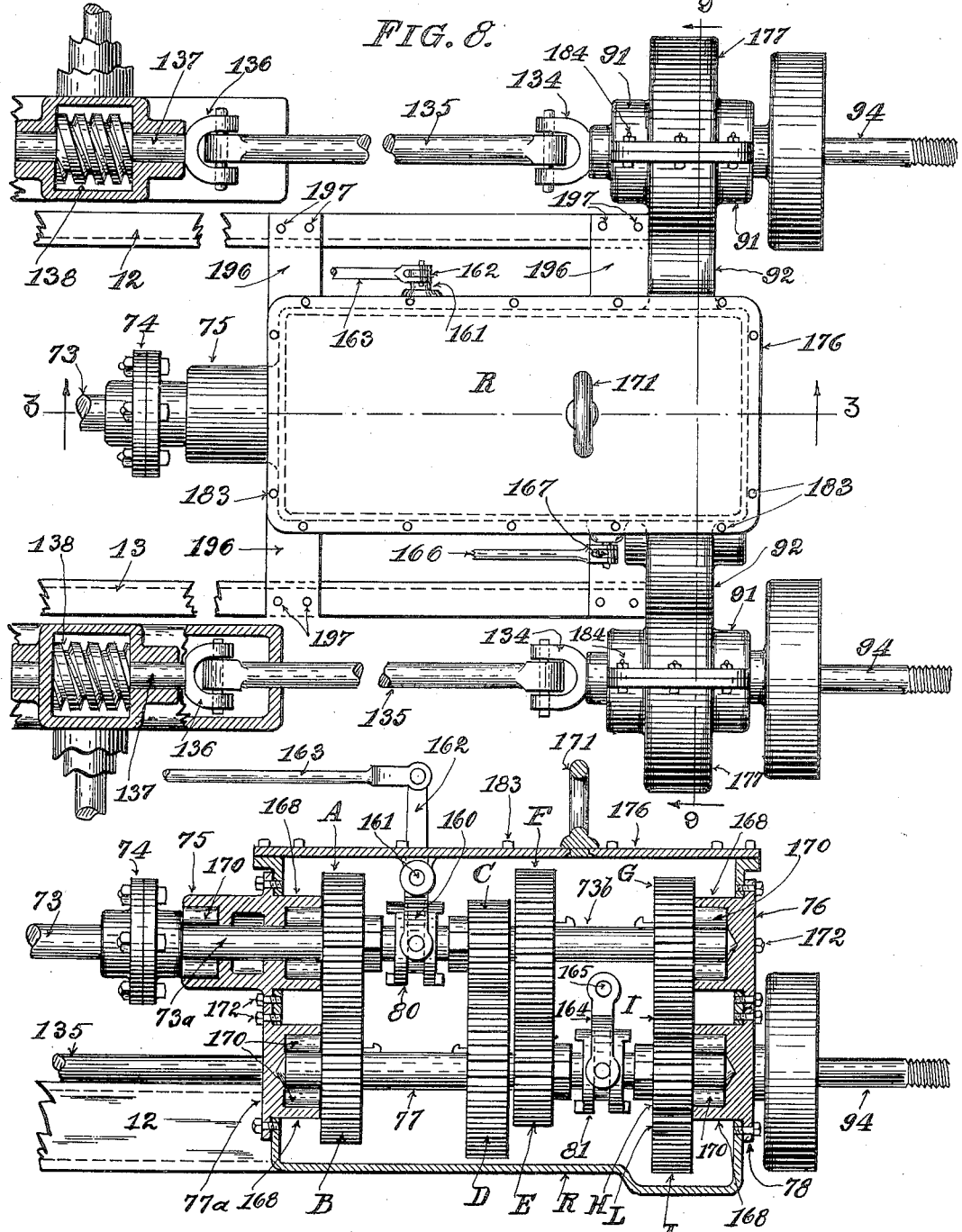

O. C. HOUGHTON.
TRANSMISSION FOR MOTOR VEHICLES.
APPLICATION FILED APR. 4, 1918.
1,317,297.
Patented Sept. 30, 1919.
4 SHEETS—SHEET 4.
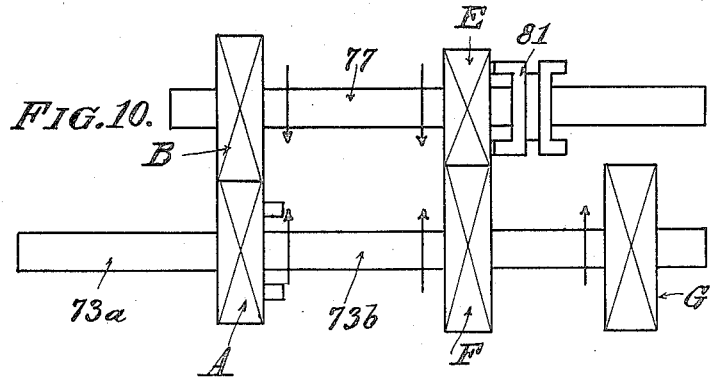
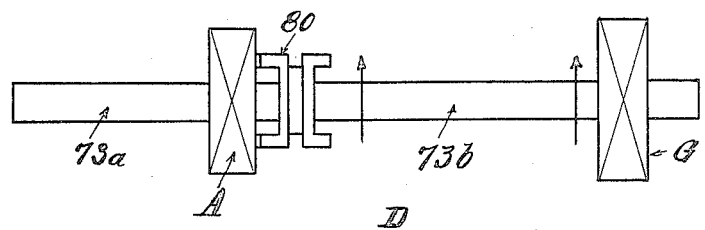
WITNESSES:
J. E. Stark.
Al. Stark.
INVENTOR:
ORLEY C. HOUGHTON.
BY Michael J. Stark & Sons
ATTORNEYS.

UNITED STATES PATENT OFFICE.

ORLEY C. HOUGHTON, OF CHICAGO, ILLINOIS, ASSIGNOR TO FREDERICK C. AUSTIN, OF CHICAGO, ILLINOIS.

TRANSMISSION FOR MOTOR-VEHICLES.

1,317,297.      Specification of Letters Patent.      Patented Sept. 30, 1919.

Original application filed September 6, 1917, Serial No. 189,925. Divided and this application filed April 4, 1918. Serial No. 226,656.

*To all whom it may concern:*

Be it known that I, ORLEY C. HOUGHTON, a citizen of the United States, and a resident of the city of Chicago, in the county of Cook and State of Illinois, have invented a certain new and useful Improvement in Transmissions for Motor-Vehicles; and I do hereby declare that the following description of my said invention, taken in connection with the accompanying sheet of drawing, forms a full, clear, and exact specification, which will enable others skilled in the art to which it appertains to make and use the same.

My invention relates generally to improvements in transmissions for motor vehicles; and it consists, essentially, in the novel and peculiar combination of parts and details of construction, as hereinafter first fully set forth and described and then pointed out in the claims.

The object of this invention is the production of an efficient, serviceable, and durable transmission for motor vehicles, and particularly for that type of traction engines in which endless track bands are employed upon which the machine is designed to travel, this present invention being a division of the application for Letters Patent of the United States, filed by me on the 6th day of September, 1917, Serial No. 189,925. Patented July 2, 1918, No. 1,270,826.

Figure 1:
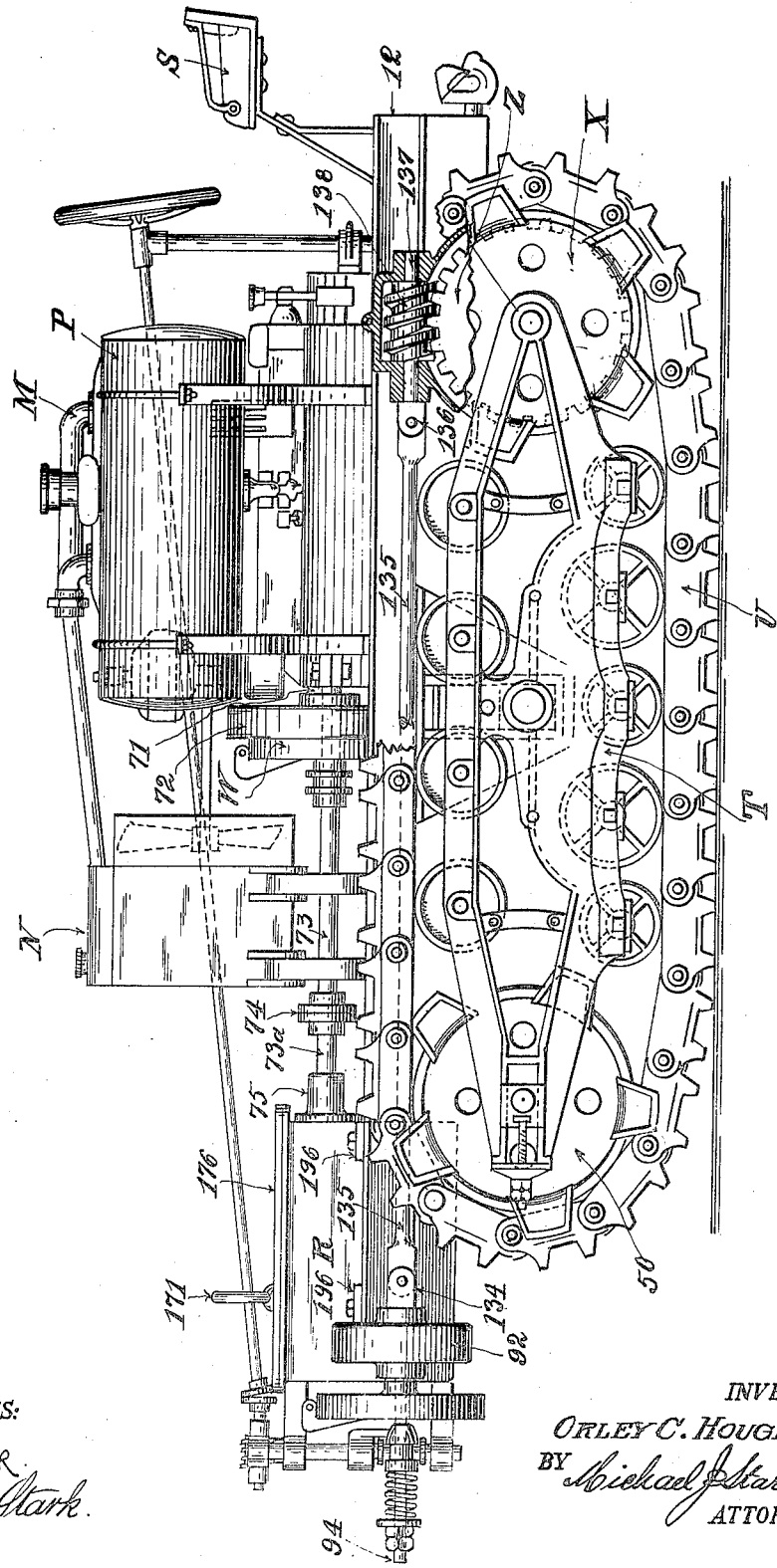
Figure 2:
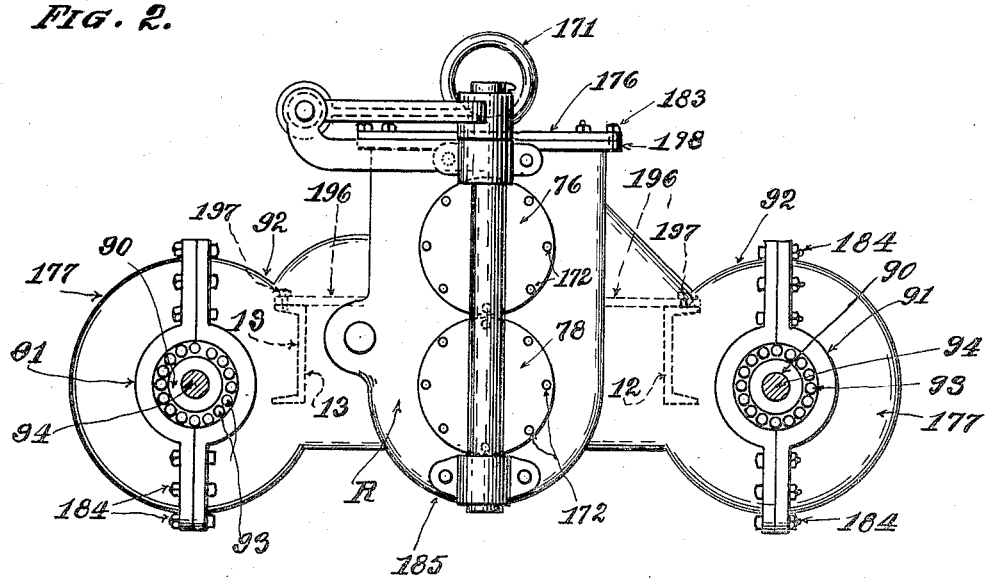
Figure 3:
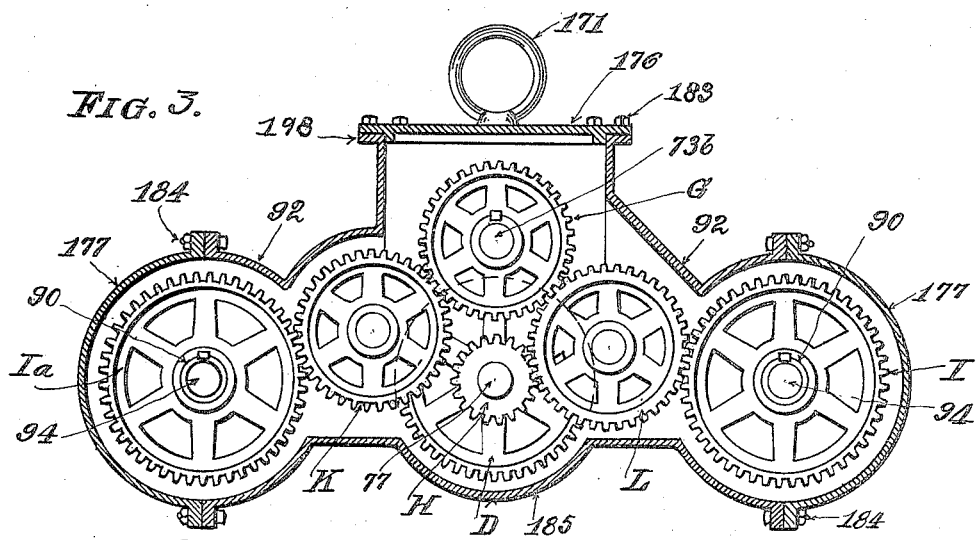
Figures 4, 5, 6, 7:
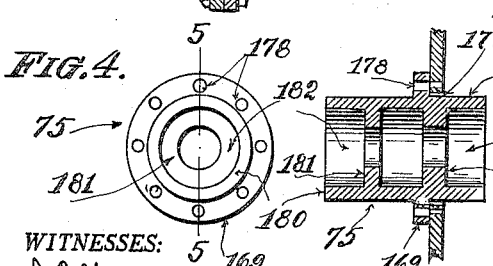

In the drawings, Figure 1 is a side elevation of a traction engine of the endless track type, part of the upper stretch of the track band being broken away to disclose otherwise obstructed parts, a portion of the driving sprocket being also removed, and a part of the worm gear casing being in section. Fig. 2 is an end elevation of the transmission gear casing. Fig. 3 is a transverse sectional elevation on line 9—9 of Fig. 8. Fig. 4 is an end elevation of one of the shaft bearings detached. Fig. 5 is a sectional view of the same on line 5—5 of Fig. 4. Fig. 6 is a sectional view of another of the shaft bearings, on line 6—6 of Fig. 7. Fig. 7 is an end view of the same. Fig. 8 is a plan of the forward part of the machine. Fig. 9 is a longitudinal sectional elevation on line 3—3 of Fig. 8. Figs. 10 to 13 inclusive are diagrammatic views of the various transmission gear combinations by which three forward, and one backward speeds of the machine are attained.

Like parts are designated by the same characters and symbols of reference in all the figures.

In order that the location of the various parts of this transmission gearing may be ascertained and these parts readily recognized, I shall first briefly describe this machine, and then specifically refer to the parts comprising the transmission gearing.

This traction engine includes a main frame or chassis, which is formed of two, preferably, channel bars 12, 13, in parallel spaced relationship, properly connected at their rear ends by a motor M, preferably of the internal combustion type of engines, which motor is securely bolted to said channel bars in an approved manner. At the front end of the chassis there is mounted a radiator, N, while near the rear end there is mounted a water tank P, and a driver's seat S. This machine is furthermore provided with all the standard equipment of a successful traction engine, and it is supported upon trucks T, one on each side of the chassis; and in these trucks there are mounted endless track bands U, on which the machine is constructed to move or travel.

These endless track bands are trained over sprocket wheels 50, X, the latter being the driving, and the former the driven or idler, sprocket.

At the forward end of the chassis there is mounted a transmission gear casing R, to be hereinafter referred to. The motor of this machine is longitudinally disposed on the chassis with its crank shaft 71, in the longitudinal center line thereof. This crank shaft carries a fly wheel 72, and adjacent this fly wheel a friction clutch W, of approved design. By means of this friction clutch the crank shaft is connected to a main transmission shaft 73, to which is connected, by a coupling 74, a continuation of said shaft 73$^a$, which latter shaft is journaled in bearing 75, near its outer end, and terminates at its inner end in a clutch gear wheel A, into the hub of which a second extension 73$^b$, of said transmission shaft enters, the rear end of which second extension is journaled in a bearing 76, secured to the casing R. This gear casing is, preferably, a rectangular casting, the lower portion of which is, preferably, semicircular as illustrated at 185 in Figs. 2 and 3, and forms, as it were, a closed receptacle for a lubricant in which the gear wheels contained in said casing rotate and by splashing the lubricant all over in the casing lubricate the moving parts in a thorough manner. In the gear casing there is, furthermore, mounted a countershaft 77, journaled in bearings 77ª, 78, and upon these two shafts 73ᵇ, and 77, there are mounted the transmission gearing, in the following manner:

Keyed to, or preferably formed integrally with, the shaft extension 73ª, there is a clutch gear wheel A, above mentioned; and upon the countershaft 77 there is keyed a gear wheel B, meshing with the gear wheel A. Upon the countershaft 77 there is, furthermore, keyed a gear wheel D, which meshes with a clutch gear wheel C, loosely mounted on the second extension 73ᵇ; and adjacent this clutch gear wheel C there is keyed to the second extension 73ᵇ, a gear wheel F, which meshes with a clutch gear wheel E, loosely mounted on the countershaft 77. Upon the second extension 73ᵇ, there is also keyed a gear wheel G; and loosely mounted near the end of the shaft 77 there is a clutch gear wheel H.

At its forward end the gear casing has two sidewise projecting extensions 92, and in these extensions are located, as illustrated in Fig. 3, two spur gear wheels I, Iª, which by means of two intermediate gear wheels L, K, connect with the gear wheels G and H, the intermediate gear wheel L meshing with both gear wheels G and H, while the intermediate gear wheel K only meshes with the gear wheel G. Between the clutch gear wheels A and C, there is splined on the second extension 73ᵇ a double-faced clutch element 80, preferably of the claw-type, which element, when moved by a forked lever 160, Fig. 9, on a transverse shaft 161, mounted in the gear case R, may be caused to engage either the clutch gear wheel A, or the clutch gear wheel C. At the outer end of this transverse shaft 161, there is placed an arm 162, which is pivotally connected to a rod 163, which leads back to a suitable distance of the operator's seat, so that the operator may manipulate the clutch element in a convenient manner.

Between the clutch gear wheels E and H, there is splined on countershaft 77, a second clutch element 81, which is manipulated by a fork 164, on a shaft 165, having at its outer end an arm 167, to which is pivoted a rod 166, which, likewise, reaches back to be operated by the attendant on the seat S. By means of this arrangement of gearing and clutches I am enabled to move the tractor forwardly at three different speeds, and backwardly at one slow speed; and in Figs. 10 to 13 inclusive, I have diagrammatically depicted the various combinations of gearing by which I attain these movements and speeds. Thus, in Fig. 10, I illustrate the combination by which I secure the slowest movement. Assume that the first extension 73ª rotates clutch gear wheel A, and that clutch gear wheel A rotates gear wheel B, and by it the countershaft 77. When the clutch element 81 engages clutch gear wheel E, this gear wheel will rotate gear wheel F, and with it the second extension 73ᵇ, and thereby rotate gear wheel G, as a driver, and G will then move intermediate gear wheels K, L, and these, in turn, rotate gear wheels I, Iª.

To attain the medium speed, which is probably the speed mostly employed, and has, therefore, the least number of gear wheels in action, I employ, as shown in Fig. 11, the clutch element 80 to connect the second extension 73ᵇ to the clutch gear wheel A, so that gear wheel G, rotated by 73ᵇ, again becomes a driver, the clutch element 81 on the countershaft 77 being in neutral position, as shown in Fig. 9, and therefore gear wheel H inactive.

For the high speed I use the combination shown in Fig. 12, in which case clutch element 80 engages clutch gear wheel C. Thus rotating A, rotates B; D rotates C, which through clutch element 80 rotates 73ᵇ, and this rotates G. The direction of the various gear movements is indicated by arrows in Figs. 10 to 13 inclusive, and shows that in all of the three instances above cited, gear wheel G rotates in the same direction. To reverse the movement of the vehicle, I avail myself of the combination shown in Fig. 13. Here the clutch element 81 engages the clutch gear wheel H, (the clutch element 80 being in neutral position) hence: A rotates B; B rotates 77, and through the clutch element 81, rotates H. By reference to Fig. 3 it will now be noted that G rotates clockwise and that H rotates in the same direction, so that when G effects the forward movement of the vehicle, H when it serves as a driver, rotates counter clockwise, as indicated in Fig. 13, and will thus cause the retroactive movement of the vehicle, it being understood that in the three forward movements gear wheel H runs idle.

In this connection I may state that the bearings 75, 76, 77ª, and 78, in which the shafts 73ª and 73ᵇ, and the countershaft 77 are journaled, are of peculiar construction, the bearings 76, 77ª, and 78 being alike, but the bearing 75 being slightly different in construction. All of these bearings, however, include a tubular hub 168, having a laterally extending flange 169, best shown in detail in Figs. 4 to 7 inclusive, by which, and screws 172, Figs. 2 and 9, passing through screw holes 178 in the flanges and tapped in the front and rear walls of the gear casing R, said bearings are secured to these walls, there being in these walls openings 179, through which the hubs 168 are passed. The bearing 75 has, in addition to the hub 168, an outwardly extending hub 180. In this latter hub there are two partitions 181, centrally punctured for the passage of the first extension 73$^a$ of the transmission shaft, and all of the hubs are recessed as at 182, for the reception of antifriction rollers 170, to reduce friction of the shafts 73$^a$, 73$^b$, and 77, as far as possible.

In order to permit of the insertion into, and the removal of the transmission gearing out of, the gear casing R, the latter is provided with a cover 176, the gear casing being flanged at its upper margins as at 198, and the cover bolted to this end of the gear casing by bolts 183. The two extensions 98 of the gear casing are made in two parts or halves, the outer halves 177, being bolted to the main portions of said extensions 92, by bolts 184. This transmission gear case with its contained elements may be completely assembled at the works and in its complete condition placed onto the chassis, said gear casing having sidewise extending flanges 196, by whch and bolt 197, the gear casing is securely fastened upon the forward end of the chassis, the casing thereby also serving as means to properly connect and space the forward ends of the channels 12, 13. And in order to enable the gear casing R, which is rather heavy, being properly placed on the chassis, a ring 171, on the cover 176 is provided so that the gear casing may be readily lifted by any suitable hoisting mechanism, and lowered into position.

The driven gear wheels I, I$^a$, are constructed to rotate two, oppositely located and approximately parallel shafts 94, by which and mechanism hereinafter to be described, the endless track bands are moved. These shafts and associated mechanisms are alike, and I shall, therefore, describe them in the singular number.

Gear wheel I is keyed to a sleeve 98, Fig. 2, which rotates in bearings 91, Fig. 8, formed on the side extensions 92 of the transmission gear casing R; antifriction rollers 93 placed in the bearings 91 being provided to reduce friction to a minimum. Shaft 94 passes through the side extension and has at its rear end a coupling 134, preferably of the universal joint type; and to this coupling is connected an operating shaft 135, which is located at, and approximately parallel with, the sides of the chassis, and which shaft connects with a coupling 136, to a short shaft 137, formed preferably integrally with a worm 138, which worm engages a worm wheel Z, by which the driving sprocket wheel X is rotated.

It is obvious that, there being two trucks and two traction elements, the above description of the worm gearing applies to both of these devices.

In Figs. 1 and 2 I have shown details of mechanisms by which the tractor is steered, including friction clutch mechanism at the forward end of the machine and a steering wheel at the rear end thereof; but since these details are fully described in the parent application mentioned in the preamble to this specification, I refrain from repeating this description in this divisional specification.

I have hereinbefore described with considerable minuteness the preferred embodiment of my invention, but I desire it to be understood that I am aware that changes may be made therein, and parts omitted without departing from the scope of my invention as defined in the subjoined claims.

Having thus fully described this invention, I claim as new, and desire to secure to myself by Letters Patent of the United States—

1. In a machine of the nature described, a transmission gear casing, comprising a rectangular casing the lower portion of said casing being semicircular, said casing having end walls, side extensions on said casing, each of said side extensions being formed of two halves, one of which is integrally formed with the casing, the other being removably bolted thereto, there being through-openings in the opposing end walls of said casing, bearings removably mounted in said openings, shafts rotatably mounted in said bearings, gearing on said shafts, and gearing in said side extensions operatively connected to the gearing in said gear casing.

2. In a machine of the nature described, the combination, of a gear casing, said gear casing being an oblong structure, the lower portion of said structure being semicircular, said casing having two oppositely located side extensions, one half of each side extension being integrally formed with the body of said casing, the other half being removably fastened to said fixed section, a removable cover on said casing, said casing having front and rear walls, there being alined through-openings in said walls, bearings removably secured to said walls and entering said through-openings, shafts rotatably mounted in said bearings, a shaft in each of said side extensions, gearing in said casing, and a gear wheel in each of said side extensions operatively connected to the gearing in said casing.

3. In a machine of the nature described, the combination, of a gear casing, said gear casing being an oblong structure, the lower portion of said structure being semicircular, said casing having two oppositely located side extensions, one half of each of said side extensions being integrally formed with the body of the casing, the other half being removably fastened to said fixed section, a removable cover on said casing, said casing having front, and rear walls, there being alined through-openings in said walls, bearings removably secured to said walls and entering said through-openings, shafts rotatably mounted in said bearings, a shaft in each of said side extensions, gearing in said casing and mounted on said shafts, and a gear wheel in each of said side extensions and operatively connected to the gearing in said casing, said casing having integrally-formed, laterally extending flanges by which said casing may be secured upon the chassis of a motor vehicle.

4. In a machine of the nature described, the combination, of a gear casing, said gear casing having a substantially rectangular form, including front, rear, and side walls and a bottom, a removable cover for said casing, there being in both, the front and rear walls two comparatively large through-openings in vertical alinement, a bearing removably secured to said front and rear walls within said through-openings, said bearings comprising hubs, entering said through-openings, said hubs having laterally-extending flanges, bolts by which said bearings are removably secured to said end-walls, a pair of shafts rotatably mounted in said bearings, gearing in said casing connecting said shafts, there being in said hubs recesses, and antifriction rollers in said recesses and surrounding said shafts.

5. In a machine of the nature described, a main transmission shaft, a gear casing, vertically alined bearings in said gear casing, a short extension of said main transmission shaft and coupled to said main transmission shaft, said extension being rotatably mounted in one of the upper ones of said bearings, a clutch gear wheel A, fixed to said extension, a second extension journaled at one end in said clutch gear wheel A and at its other end in the upper opposing bearing, a countershaft rotatably mounted in the lower pair of said bearings, a fixed gear wheel B, on the countershaft and meshing with the clutch gear wheel A, a clutch gear pinion C, loosely mounted on the second extension of said transmission shaft, a clutch element splined to the second extension between said clutch gear wheel A and the clutch gear pinion C, a spur gear wheel D, fixed to said countershaft and meshing with said clutch gear pinion C, a spur gear wheel F, fixed to the second extension adjacent the clutch gear pinion C, a clutch gear pinion E, on the countershaft and engaging the spur gear wheel F, a clutch gear pinion H, adjacent the end of the countershaft, a second clutch element mounted on the countershaft between the two clutch gear pinions E and H, a gear wheel G adjacent the end of the second extension, and means for moving the two clutch elements, the gear wheel G being the driving element for the forward movement, and the clutch gear pinion H being the driving element for the backward movement of the machine.

6. In a motor driven vehicle having traction means on each side of the vehicle, the combination, of a transmission gear casing at the forward part of the vehicle, said transmission gear casing having at opposing sides extensions, a driving shaft in said gear casing, a countershaft in said gear casing in vertically-spaced, parallel, relationship with said driving shaft, a train of gearing mounted on, and connecting said shafts, each shaft having at one end a driving gear wheel, a bearing in each of said extensions, a shaft rotatably mounted in each of said bearings, a spur gear wheel on each of the latter shafts and mounted in said extension, an idler gear wheel meshing with both of the driving gear wheels on the gear casing shafts and with one of the spur gear wheels in said side extensions, a second idler gear wheel connecting the upper driving gear wheel in the gear casing with the spur gear wheel in the other of said side extensions, said shafts in said side extensions reaching back to, and carrying means for, operating said traction means.

In testimony that I claim the foregoing as my invention, I have hereunto set my hand.

ORLEY C. HOUGHTON.